(12) United States Patent
Yang et al.

(10) Patent No.: US 10,205,153 B2
(45) Date of Patent: Feb. 12, 2019

(54) BATTERY CELL ASSEMBLY OF ENHANCED SAFETY AND BATTERY MODULE COMPRISING THE SAME

(71) Applicant: LG Chem, Ltd., Seoul (KR)

(72) Inventors: JungHoon Yang, Daejeon (KR); Seungdon Choi, Daejeon (KR); YoJin Kim, Daejeon (KR)

(73) Assignee: LG Chem, Ltd. (KR)

( * ) Notice: Subject to any disclaimer, the term of this patent is extended or adjusted under 35 U.S.C. 154(b) by 898 days.

(21) Appl. No.: 14/446,486

(22) Filed: Jul. 30, 2014

(65) Prior Publication Data

US 2014/0335397 A1 Nov. 13, 2014

Related U.S. Application Data

(63) Continuation of application No. PCT/KR2013/001590, filed on Feb. 27, 2013.

(30) Foreign Application Priority Data

Feb. 29, 2012 (KR) .................. 10-2012-0020710

(51) Int. Cl.
*H01M 2/34* (2006.01)
*H01M 2/10* (2006.01)
(Continued)

(52) U.S. Cl.
CPC ........... *H01M 2/345* (2013.01); *B60L 3/0046* (2013.01); *B60L 3/12* (2013.01); *B60L 11/1859* (2013.01);
(Continued)

(58) Field of Classification Search
CPC ..................................................... H01M 2/345
See application file for complete search history.

(56) References Cited

U.S. PATENT DOCUMENTS

2002/0160257 A1 10/2002 Lee et al.
2005/0164094 A1 7/2005 Kotato et al.
(Continued)

FOREIGN PATENT DOCUMENTS

CN 101164179 A 4/2008
CN 100514710 C 7/2009
(Continued)

OTHER PUBLICATIONS

International Search Report for Application No. PCT/KR2013/001590 dated Jun. 1, 2013.

*Primary Examiner* — Ula C Ruddock
*Assistant Examiner* — Thomas H. Parsons
(74) *Attorney, Agent, or Firm* — Lerner, David, Littenberg, Krumholz & Mentlik, LLP

(57) ABSTRACT

Disclosed herein is a battery cell assembly including a plurality of battery cells stacked while being electrically connected to each other, wherein one or more of the battery cells are mounted in each cell housing member in a state in which opposite sides of the battery cells are surrounded by each cell housing member excluding electrode terminals of the battery cells, an expansion opening part, through which a portion of a main body of each of the battery cells is exposed outward when the battery cells expand, is formed at one surface or opposite surfaces of each of the at least two cell housing members and the battery cells are stacked such that the at least two expansion opening parts face each other.

19 Claims, 3 Drawing Sheets

(51) Int. Cl.

| | | |
|---|---|---|
| *H01M 2/20* | (2006.01) | |
| *H01M 2/02* | (2006.01) | |
| *B60L 3/00* | (2006.01) | |
| *B60L 3/12* | (2006.01) | |
| *B60L 11/18* | (2006.01) | |
| *H01M 10/625* | (2014.01) | |
| *H01M 10/647* | (2014.01) | |
| *H01M 10/6551* | (2014.01) | |
| *H01M 10/613* | (2014.01) | |

(52) U.S. Cl.
CPC ....... *B60L 11/1864* (2013.01); *B60L 11/1879* (2013.01); *H01M 2/024* (2013.01); *H01M 2/1061* (2013.01); *H01M 2/1077* (2013.01); *H01M 2/206* (2013.01); *B60L 2240/545* (2013.01); *B60L 2240/547* (2013.01); *B60L 2240/549* (2013.01); *H01M 10/613* (2015.04); *H01M 10/625* (2015.04); *H01M 10/647* (2015.04); *H01M 10/6551* (2015.04); *H01M 2200/20* (2013.01); *H01M 2220/20* (2013.01); *H01M 2220/30* (2013.01); *Y02T 10/7005* (2013.01); *Y02T 10/7061* (2013.01)

(56) References Cited

U.S. PATENT DOCUMENTS

| | | |
|---|---|---|
| 2006/0267545 A1 | 11/2006 | Lee et al. |
| 2006/0275661 A1 | 12/2006 | Kim et al. |
| 2007/0287064 A1 | 12/2007 | Suzuki et al. |
| 2009/0325043 A1 | 12/2009 | Yoon et al. |
| 2010/0112451 A1 | 5/2010 | Shibutani et al. |
| 2010/0297482 A1 | 11/2010 | Yoon et al. |
| 2011/0059347 A1 | 3/2011 | Lee et al. |
| 2011/0189514 A1 | 8/2011 | Lee et al. |
| 2011/0189515 A1* | 8/2011 | Yoon ................. H01M 10/0413 429/61 |

FOREIGN PATENT DOCUMENTS

| | | |
|---|---|---|
| EP | 2131413 A1 | 12/2009 |
| EP | 2293361 A2 | 3/2011 |
| JP | 2004111219 A | 4/2004 |
| JP | 2006-019140 A | 1/2006 |
| JP | 2009537944 A | 10/2009 |
| JP | 2010092833 A | 4/2010 |
| JP | 2011526061 A | 9/2011 |
| JP | 2011249107 A | 12/2011 |
| JP | 2012523086 A | 9/2012 |
| KR | 20060116424 A | 11/2006 |
| KR | 20070110565 A | 11/2007 |
| KR | 10-0914839 B1 | 9/2009 |
| KR | 20090131573 A | 12/2009 |
| KR | 20100000764 A | 1/2010 |
| KR | 20100109872 A | 10/2010 |

* cited by examiner

[FIG. 1]
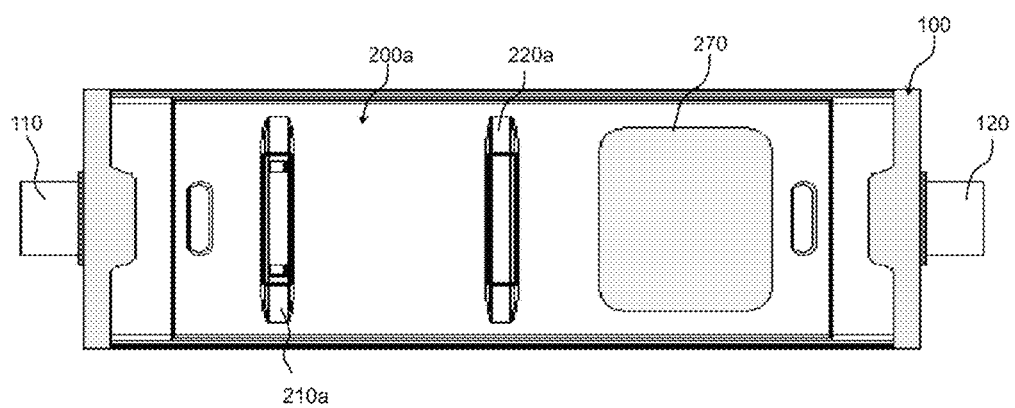
[FIG. 2]
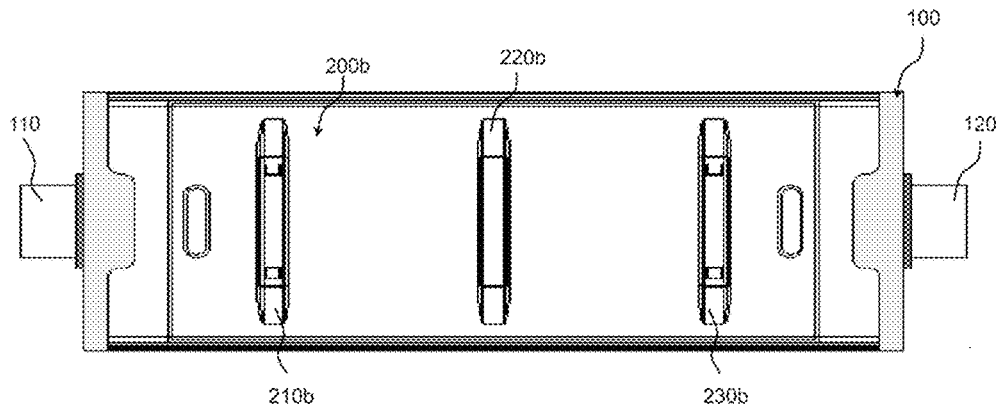

[FIG. 3]
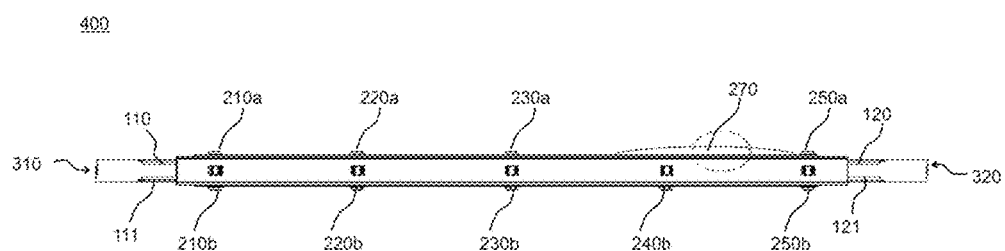
[FIG. 4]
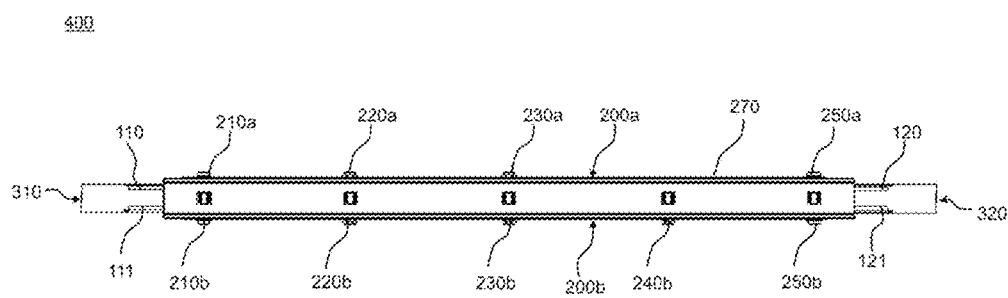
[FIG. 5]
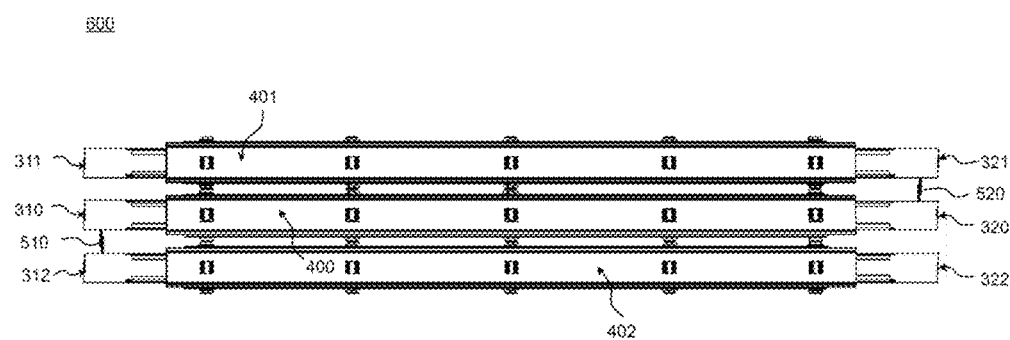

[FIG. 6]
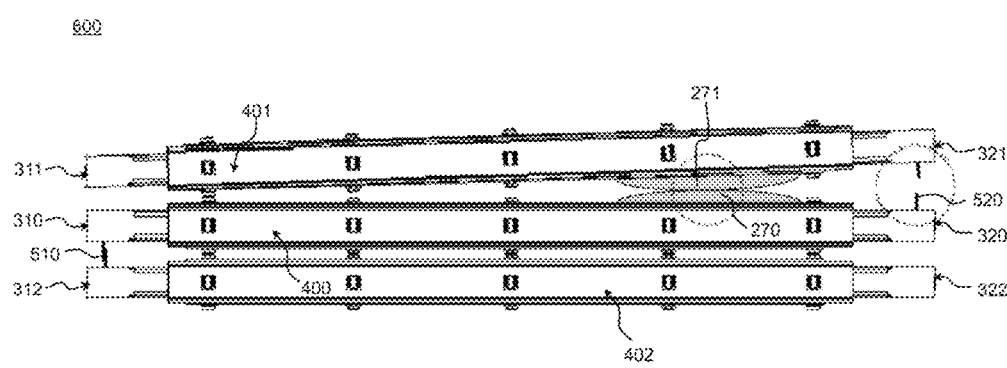
[FIG. 7]
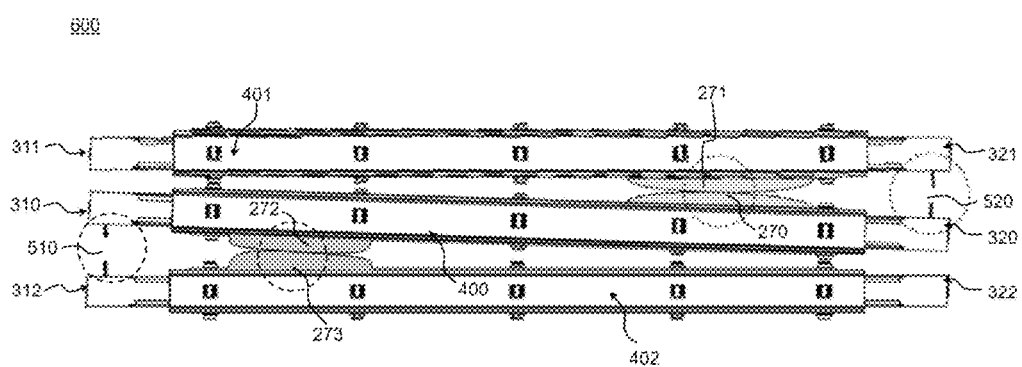

BATTERY CELL ASSEMBLY OF ENHANCED SAFETY AND BATTERY MODULE COMPRISING THE SAME

CROSS-REFERENCE TO RELATED APPLICATIONS

The present application is a continuation of International Patent Application No. PCT/KR2013/001590, filed Feb. 27, 2013, which claims the priority from Korean Application No. 10-2012-0020710, filed Feb. 29, 2012, in the Korean Intellectual Property Office, the disclosures of which are incorporated herein by reference.

TECHNICAL FIELD

The present invention relates to a battery cell assembly with improved safety and a battery module including the same and, more particularly, to a battery cell assembly including a plurality of battery cells stacked while being electrically connected to each other, wherein one or more of the battery cells are mounted in each cell housing member in a state in which opposite sides of the battery cells are surrounded by each cell housing member excluding electrode terminals of the battery cells, an expansion opening part, through which a portion of a main body of each of the battery cells is exposed outward when the battery cells expand, is formed at one surface or opposite surfaces of each of the at least two cell housing members and the battery cells are stacked such that the at least two expansion opening parts face each other.

BACKGROUND ART

Recently, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-In HEV), which have been developed to solve problems, such as air pollution, caused by existing gasoline and diesel vehicles using fossil fuels or as a power storage device to store surplus power such that the power can be used as needed.

Small-sized mobile devices use one or several battery cells for each device. On the other hand, middle or large-sized devices, such as vehicles, use a battery module having a plurality of battery cells electrically connected to each other because high output and large capacity are necessary for the middle or large-sized devices.

Preferably, the battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on such a pouch-shaped battery, which uses an aluminum laminate sheet as a sheathing member, because the pouch-shaped battery is lightweight and the manufacturing cost of the pouch-shaped battery is low.

Meanwhile, the battery module is configured to have a structure in which a plurality of battery cells is combined. In a case in which some of the battery cells are overcharged or overdischarged, therefore, a large amount of gas is generated due to decomposition of an electrolyte with the result that a battery case of each of the battery cells swells, i.e. a so-called swelling phenomenon occurs. The swelling phenomenon further accelerates decomposition of the electrolyte while causing high pressure in the sealed battery case with the result that the battery module may explode. Furthermore, abnormal operation of some of the battery cells may cause abnormal operation of the other battery cells with the result that a fire or explosion of the battery module may occur, which may lead to a large-scale accident.

For this reason, the secondary battery is provided with a safety system, such as a protection circuit to interrupt electric current when the secondary battery is overcharged or overdischarged or when overcurrent flows in the secondary battery, a positive temperature coefficient (PTC) element whose resistance greatly increases so as to interrupt electric current when the temperature of the secondary battery increases, or a safety vent to interrupt electric current or to exhaust gas when pressure increases due to generation of the gas. On the other hand, a multi cell type middle or large-sized battery pack, which is configured to have a multi cell structure in which a plurality of battery modules is combined, is provided with a safety system, such as a fuse, a bimetal, or a battery management system (BMS), to protect battery cells from overcharge, overdischarge, or overcurrent.

However, the safety system, such as the PTC element or the BMS, may malfunction. On the other hand, a current interrupt device (CID) system, which is mainly used as a method of interrupting electrical connection between a middle or large-sized battery pack and an external device when the middle or large-sized battery pack abnormally operates, is configured to operate only when the outermost battery modules or the outermost battery cells abnormally operate. In a case in which the outermost battery modules or the outermost battery cells normally operate, therefore, it is difficult to exhibit a desired effect.

In addition, it is necessary to inevitably provide a space through which the battery modules or the battery cells are partially exposed to the outside even in a case in which the outermost battery modules or the outermost battery cells swell with the result that it is difficult to increase the capacity per volume.

Consequently, there is a high necessity for a battery cell assembly configured to have a novel structure that is capable of fundamentally securing safety of the battery module and the battery pack while solving the above problems.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have found that, when expansion force generated in battery cells laterally stacked while being adjacent to each other due to swelling of the battery cells are applied to the battery cells in opposite directions in an abnormal operation state of a battery cell assembly with the result that an electrical connection region between the battery cells is ruptured, it is possible to increase force required to rupture the an electrical connection region between the battery cells while improving operational reliability and stability. The present invention has been completed based on these findings.

Technical Solution

In accordance with one aspect of the present invention, the above and other objects can be accomplished by the provision of a battery cell assembly including a plurality of battery cells stacked while being electrically connected to each other, wherein one or more of the battery cells are mounted in each cell housing member in a state in which opposite sides of the battery cells are surrounded by each cell housing member excluding electrode terminals of the battery cells, an expansion opening part, through which a portion of a main body of each of the battery cells is exposed outward when the battery cells expand, is formed at one surface or opposite surfaces of each of the at least two cell housing members and the battery cells are stacked such that the at least two expansion opening parts face each other.

In the battery cell assembly according to the present invention, the battery cells are stacked such that the at least two expansion opening parts formed at one surface or opposite surfaces of the at least two cell housing members face each other. In a case in which one or more battery cells mounted in each cell housing member abnormally operate and a portion of the main body of each of the battery cells is exposed outward through a corresponding one of the expansion opening parts, therefore, expansion force generated in the battery cells due to swelling of the battery cells to the battery cells in opposite direction such that the distance between the cell housing members is increased with the result that electrical connection between the battery cells mounted in the cell housing members stacked while being adjacent to each other may be ruptured. The electrical connection may be series connection or parallel connection as described below.

As previously described, abnormal operation of some of the battery cells may cause abnormal operation of the other battery cells. As a result, the cut-off effect of the electrical connection is successively achieved between the battery cells mounted in the cell housing members stacked while being adjacent to each other. Consequently, the battery cell assembly according to the present invention has higher safety and operational reliability than the conventional battery cell assembly.

As described above, one battery cell may be mounted in each cell housing member. On the other hand, two or more battery cells may be mounted in each cell housing member. A battery cell assembly configured to have a structure in which two or more battery cells may be mounted in a cell housing member may be referred to as a unit module.

The battery cells may be electrically connected to each other using various methods. For example, the battery cells may be electrically connected in parallel to each other via a bus bar. On the other hand, the battery cells may be electrically connected in series to each other via an inter bus bar.

In a case in which one battery cell is mounted in each cell housing member, the battery cells may be configured to have a structure in which the battery cells are stacked while being connected in series to each other via the inter bus bar. Of course, the battery cells may be configured to have a structure in which the battery cells are stacked while being connected in parallel to each other via the bus bar.

In a case in which the battery cells are stacked while being connected in parallel to each other, however, the parallel connected battery cells, i.e. the battery cells between the respective cell housing members, may be connected in series to each other. The series connection may be achieved using the inter bus bar.

On the other hand, in a case in which two or more battery cells are mounted in each cell housing member, the battery cells may be connected in series or in parallel to each other.

In addition, the battery cells between the respective cell housing members may be connected in parallel or in series to each other.

In a concrete example of the present invention, the battery cells mounted in each cell housing member may be connected in parallel to each other via the bus bar and the battery cells between the respective cell housing members may be connected in series to each other via the inter bus bar.

In an abnormal operation state of the battery cells, expansion force generated due to swelling of the battery cells is concentrated on the expansion opening parts. As a result, the inter bus bar or the bus bar and the inter bus bar may be ruptured, whereby the battery cell assembly is cut off.

In connection with this case, the inventors of the present application have found that, in a case in which the battery cells are connected in series and in parallel to each other as described above, it is difficult to simultaneously rupture the series connection region and the parallel connection region only using expansion force generated due to swelling of the battery cells applied in one direction while having a magnitude to rupture the series connection region of the outermost battery modules or the outermost battery cells. On the other hand, in a case in which the battery cells are connected in series and in parallel to each other, the battery cell assembly according to the present invention exhibits higher safety and operational reliability than the conventional battery cell assembly.

The expansion opening parts may be formed at opposite surfaces of some or all of the other ones of the cell housing members excluding the uppermost and lowermost ones of the cell housing members. Preferably, the expansion opening parts are formed at opposite surfaces of all of the other ones of the cell housing members excluding the uppermost and lowermost ones of the cell housing members.

In this case, one of the expansion opening parts may be formed at a lower surface of the uppermost one of the cell housing members and one of the expansion opening parts may be formed at an upper surface of a lowermost one of the cell housing members. The expansion opening parts formed at the opposite surfaces of the cell housing members, i.e. the expansion opening part formed at the upper surface (or the lower surface) of the cell housing member and the expansion opening part formed at the lower surface (or the upper surface) of the cell housing member, may be diagonally arranged. On the other hand, the expansion opening part formed at the upper surface (or the lower surface) of the cell housing member and the expansion opening part formed at the lower surface (or the upper surface) of the cell housing member, may face each other.

A pair of the expansion opening parts facing each other and another adjacent pair of the expansion opening parts may be diagonally arranged or may face each other.

In this specification, the upper surface and the lower surface of the cell housing member illustratively refer to one surface and the other corresponding surface of the cell housing member. That is, the upper surface and the lower surface of the cell housing member are not restrictive.

Each of the expansion opening parts may have various shapes. For example, each of the expansion opening parts may be formed at each cell housing member in the shape of an opening, through which a portion of the main body of a corresponding one of the battery cells is exposed even in a state in which the battery cell does not expand. On the other hand, each of the expansion opening parts may be formed at each cell housing member in the shape of a notch configured to be ruptured when a corresponding one of the battery cells expands such that a portion of the main body of the battery cell is exposed.

Even in any of the above cases, each of the expansion opening parts may be formed at a position of each cell housing member adjacent to an electrode terminal connection region between the battery cells such that the electrode terminal connection region, i.e. the bus bar or the inter bus bar, is ruptured when the battery cells expand and, therefore, the battery cell assembly is cut off. Specifically, each of the expansion opening parts may be formed at one side part of each cell housing member adjacent to the electrode terminal connection region.

In this case, each of the expansion opening parts may have an area equivalent to 10 to 50% the total area of one surface of each cell housing member at a position of each cell housing member adjacent to an electrode terminal connection region between the battery cells.

The expression "each of the expansion opening parts may have an area equivalent to 50% the total area of one surface of each cell housing member" may mean that the expansion opening part is formed at the entirety of one side part, e.g. the left side part or the right side part, of the cell housing member in the shape of an opening.

Each of the battery cells may be a battery cell configured to have a structure in which an electrode assembly is mounted in a battery case formed of a laminate sheet comprising a metal layer and a resin layer and the battery case is thermally bonded along an outer circumference of an electrode assembly receiving unit to form a sealed portion, i.e. a so-called a pouch-shaped battery cell. Each cell housing member may include a pair of a first housing and a second housing coupled to each other.

The first housing of a first one of the battery cells and the second housing of a second one of the battery cells constituting a stacked structure together with the first one of the battery cells may be provided at outer surfaces thereof with protrusions to define coolant channels formed at regions of the first housing and the second housing excluding the expansion opening parts. In this case, the protrusions may be formed at corresponding positions.

Each of the battery cells may be used as an electric power source for small-sized devices. In addition, each of the battery cells may be used as a unit battery of a middle or large-sized battery module including a plurality of battery cells, i.e. a battery cell assembly.

In accordance with another aspect of the present invention, there is provided a battery pack including the battery module with the above-stated construction as an electric power source of a middle or large-sized device. The middle or large-sized device may be an electric means of transport, such as an electric vehicle (EV), a hybrid electric vehicle (HEV), or a plug-in hybrid electric vehicle (PHEV), or a power storage device. However, the present invention is not limited thereto.

The structure and a manufacturing method of the middle or large-sized device are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a plan view showing a battery cell mounted in a cell housing member according to an embodiment of the present invention;

FIG. 2 is a rear view showing the battery cell mounted in the cell housing member according to the embodiment of the present invention;

FIG. 3 is a side view typically showing a unit module configured to have a structure in which two battery cells are mounted in a cell housing member according to an embodiment of the present invention;

FIG. 4 is a side view typically showing a case in which the battery cells abnormally operate in the unit module structure shown in FIG. 3;

FIG. 5 is a side view typically showing a structure in which unit modules, one of which is shown in FIG. 3, are stacked such that expansion opening parts of the unit modules faces each other;

FIG. 6 is a side view typically showing a case in which the battery cells abnormally operate in the structure shown in FIG. 5; and FIG. 7 is a side view typically showing a case in which battery cells abnormally operate in another structure in which unit modules are stacked.

BEST MODE

Now, preferred embodiments of the present invention will be described in detail with reference to the accompanying drawings. It should be noted, however, that the scope of the present invention is not limited by the illustrated embodiments.

FIG. 1 is a plan view showing a battery cell mounted in a cell housing member according to an embodiment of the present invention and FIG. 2 is a rear view showing the battery cell mounted in the cell housing member according to the embodiment of the present invention.

Referring to FIGS. 1 and 2, opposite sides of a battery cell 100 having electrode terminals 110 and 120 formed at opposite ends thereof are surrounded by a cell housing member. The cell housing member includes a pair of a first housing 200a and a second housing 200b coupled to each other. The first housing 200a is provided at the outer surface thereof with protrusions 210a and 220a to define a coolant channel, which are formed at a region of the first housing 200a excluding an expansion opening part 270. The second housing 200b is provided at the outer surface thereof with protrusions 210b, 220b, and 230b to define a coolant channel.

The expansion opening part 270 is formed in the shape of an opening, through which a portion of a main body of the battery cell 100 is exposed even when the battery cell 100 does not expand. The expansion opening part 270 has an area equivalent to about 40% the total area of the cell housing member. The expansion opening part 270 is formed at the right side part of the cell housing member.

FIG. 3 is a side view typically showing a unit module configured to have a structure in which two battery cells are mounted in a cell housing member according to an embodiment of the present invention, FIG. 4 is a side view typically showing a case in which the battery cells abnormally operate in the unit module structure shown in FIG. 3, FIG. 5 is a side view typically showing a structure in which unit modules, one of which is shown in FIG. 3, are stacked such that expansion opening parts of the unit modules faces each other, and FIG. 6 is a side view typically showing a case in which the battery cells abnormally operate in the structure shown in FIG. 5.

Referring to FIGS. 3 to 6, a battery cell having electrode terminals 110 and 120 formed at opposite ends thereof and another battery cell having electrode terminals 111 and 121 formed at opposite ends thereof are mounted in a cell housing in a state in which the battery cells are connected in parallel to each other (310 and 320).

The cell housing member includes a pair of a first housing 200a and a second housing 200b coupled to each other. The first housing 200a is provided at the outer surface thereof with protrusions 210a, 220a, 230a, and 250a to define a coolant channel, which are formed at a region of the first housing 200a excluding an expansion opening part 270. The second housing 200b is provided at the outer surface thereof with protrusions 210b, 220b, 230b, 240b, and 250b to define a coolant channel.

A battery cell assembly 600 is configured to have a structure in which unit modules 400, 401, and 402, each of which is configured to have the same structure as a unit module of FIG. 3 including two or more battery cells mounted in a cell housing member, are stacked in a state in which the modules 400, 401, and 402 are connected in series to one another (510 and 520) such that expansion opening parts 270 and 271 face each other and protrusions are formed at the outer surfaces of the respective cell housings such that the protrusions correspond to each other excluding the expansion opening parts 270 and 271 to define a coolant channel among the stacked unit modules 400, 401, and 402.

In the same manner as in the unit module 400, each of the unit modules 401 and 402 is configured to have a structure in which two battery cells each having electrode terminals formed at opposite ends thereof are mounted in a cell housing member in a state in which the battery cells are connected in parallel to each other (311, 321, 312, and 322).

Referring to FIGS. 4 and 6, when the battery cells abnormally operate, portions of main bodies of the battery cells are exposed outward through the expansion opening parts 270 and 271, which face each other. Consequently, the distance between the unit modules 400 and 401 is increased with the result that the series connection 520 is ruptured and, therefore, the battery cell assembly 600 is electrically cut off.

FIG. 7 is a side view typically showing another embodiment of a case in which battery cells abnormally operate. Referring to FIG. 7, a cell housing member 400 is provided at an upper surface and a lower surface thereof with expansion opening parts 270 and 272, which are diagonally arranged. A cell housing member 402 is provided at an upper surface with an expansion opening part 273 and a cell housing member 401 is provided at a lower surface with an expansion opening part 271. The expansion opening parts 270 and 271 and the expansion opening parts 272 and 273 are diagonally arranged in a state in which the cell housing member 400 is between the expansion opening parts 270 and 271 and the expansion opening parts 272 and 273.

The cell housing member 402 is the lowermost cell housing member. The cell housing member 402 is fixed to a module case (not shown).

When the battery cells of the respective unit modules 401 and 402 abnormally operate, expansion pressure is concentrated on the expansion opening parts 272 and 273, which face each other, and portions of main bodies of the respective battery cells are exposed outward through the expansion opening parts 272 and 273. Consequently, the distance between the unit modules 401 and 402 is increased with the result that the series connection 510 is ruptured and, therefore, the battery cell assembly 600 is electrically cut off.

Example 1

A cathode slurry was prepared by putting and mixing 95 weight percent of $LiCoO_2$, 2.5 weight percent of Super-P, and 2.5 weight percent of PVdf in NMP. The cathode slurry was coated on an aluminum foil having a thickness of 20 µm such that the cathode slurry has a thickness of 200 µm, rolled, and dried to manufacture a cathode.

An anode slurry was prepared by putting and mixing 96 weight percent of graphite, 1.5 weight percent of Super-P, and 2.5 weight percent of SBR/CMC in water. The anode slurry was coated on a copper foil having a thickness of 10 in, rolled, and dried to manufacture an anode.

An electrode assembly including a cathode, an anode, and a separator disposed between the cathode and the anode was mounted in a battery case formed of a laminate sheet including a metal layer and a resin layer, an a carbonate electrolytic solution containing 1 mole of $LiPF_6$ dissolved therein was impregnated as an electrolyte, and a battery case was thermally bonded along the outer circumference of an electrode assembly receiving unit to manufacture a pouch-shaped battery cell having a sealed portion.

Example 2

Some of pouch-shaped battery cells manufactured according to Example 1 were charged and discharged 100 times under a temperature condition of 45 t, a charging condition of 1.0 C, and a discharging condition of 1.0 C.

Example 3

Two pouch-shaped battery cells were mounted in a cell housing member in a state in which the pouch-shaped battery cells were connected in parallel to each other to manufacture a unit module.

A plurality of unit modules was stacked in a state in which the unit modules were connected in series to each other to manufacture a battery cell assembly according to the present invention.

An expansion opening part was formed at the lower surface of the uppermost unit module, an expansion opening part was formed at the upper surface of an adjacent unit module stacked under the uppermost unit module, and the unit modules were arranged such that the expansion opening parts faced each other.

The uppermost unit module and the adjacent unit module stacked under the uppermost unit module were constituted by the pouch-shaped battery cells manufactured according to Example 2.

The remaining unit modules excluding the uppermost battery cell and the uppermost unit module were constituted by the pouch-shaped battery cells manufactured according to Example 1.

Example 4

Two pouch-shaped battery cells were mounted in a cell housing member in a state in which the pouch-shaped battery cells were connected in parallel to each other to manufacture a unit module.

A plurality of unit modules was stacked in a state in which the unit modules were connected in series to each other to manufacture a battery cell assembly according to the present invention.

An expansion opening part was formed at the lower surface of the uppermost unit module and an expansion opening part was formed at the upper surface of the lowermost unit module.

Expansion opening parts were formed at the upper surfaces and the lower surfaces of the remaining unit modules excluding the uppermost unit module and the lowermost unit module such that the expansion opening parts formed at the upper surfaces and the lower surfaces of the remaining unit modules were diagonally arranged.

A pair of expansion opening parts facing each other and another adjacent pair of expansion opening parts were diagonally arranged.

All of the unit modules were constituted by the pouch-shaped battery cells manufactured according to Example 2.

Example 5

Two pouch-shaped battery cells were mounted in a cell housing member in a state in which the pouch-shaped battery cells were connected in parallel to each other to manufacture a unit module.

A plurality of unit modules was stacked in a state in which the unit modules were connected in series to each other to manufacture a battery cell assembly according to the present invention.

An expansion opening part was formed at the lower surface of the uppermost unit module and an expansion opening part was formed at the upper surface of the lowermost unit module.

Expansion opening parts were formed at the upper surfaces and the lower surfaces of the remaining unit modules excluding the uppermost unit module and the lowermost unit module such that the expansion opening parts formed at the upper surfaces and the lower surfaces of the remaining unit modules were diagonally arranged.

A pair of expansion opening parts facing each other and another adjacent pair of expansion opening parts were diagonally arranged.

One of the remaining unit modules excluding the uppermost unit module and the lowermost unit module was constituted by the pouch-shaped battery cells manufactured according to Example 2 and the other unit modules were constituted by the pouch-shaped battery cells manufactured according to Example 1.

Comparative Example 1

Two pouch-shaped battery cells were mounted in a cell housing member in a state in which the pouch-shaped battery cells were connected in parallel to each other to manufacture a unit module.

A plurality of unit modules was stacked in a state in which the unit modules were connected in series to each other to manufacture a battery cell assembly according to the present invention.

An expansion opening part was formed only at the upper surface of the uppermost unit module.

The uppermost unit module and an adjacent unit module stacked under the uppermost unit module were constituted by the pouch-shaped battery cells manufactured according to Example 2.

The remaining unit modules excluding the uppermost battery cell and the uppermost unit module were constituted by the pouch-shaped battery cells manufactured according to Example 1.

Comparative Example 2

Two pouch-shaped battery cells were mounted in a cell housing member in a state in which the pouch-shaped battery cells were connected in parallel to each other to manufacture a unit module.

A plurality of unit modules was stacked in a state in which the unit modules were connected in series to each other to manufacture a battery cell assembly according to the present invention.

An expansion opening part was formed only at the upper surface of the uppermost unit module.

All of the unit modules were constituted by the pouch-shaped battery cells manufactured according to Example 2.

Comparative Example 3

Two pouch-shaped battery cells were mounted in a cell housing member in a state in which the pouch-shaped battery cells were connected in parallel to each other to manufacture a unit module.

A plurality of unit modules was stacked in a state in which the unit modules were connected in series to each other to manufacture a battery cell assembly according to the present invention.

An expansion opening part was formed only at the upper surface of the uppermost unit module.

One of the remaining unit modules excluding the uppermost unit module and the lowermost unit module was constituted by the pouch-shaped battery cells manufactured according to Example 2 and the other unit modules were constituted by the pouch-shaped battery cells manufactured according to Example 1.

Experimental Example 1

The unit modules manufactured according to Examples 3 to 5 and the unit modules manufactured according to Comparative examples 1 to 3 were repeatedly charged and discharged under a temperature condition of 45° C., a charging condition of 1.0 C, and a discharging condition of 1.0 C. The results are shown in Table 1 below.

TABLE 1

| | Time required for cut-off |
|---|---|
| Example 3 | 34 minutes |
| Comparative example 1 | Not cut off |
| Example 4 | 28 minutes |
| Comparative example 2 | Not cut off |
| Example 5 | 41 minutes |
| Comparative example 3 | Not cut off |

Referring to Table 1 above, it can be seen that the unit modules manufactured according to Examples 3, 4, and 5 were cut off more rapidly than the unit modules manufactured according to Comparative examples 1, 2, and 3 configured such that the expansion opening part was formed only at the upper surface of the uppermost unit module.

In Comparative examples 1, 2, and 3, the parallel connection between the battery cells constituting the uppermost unit module was ruptured but the electrical connection between the uppermost unit module and the other unit modules was maintained.

Upon comparison between Example 4 and Comparative example 2, it can be seen that the unit modules according to Comparative example 2 were not cut off because force to rupture the parallel connection between the battery cells constituting the uppermost unit module was low, whereas the unit modules according to Example 4 were cut off within a short time because expansion force of the battery cells was concentrated.

Upon comparison between Example 5 and Comparative example 3, it can be seen that safety of the battery cell assembly according to the present invention was secured even when any one of the battery cells constituting the remaining stacked unit modules excluding the outermost unit modules abnormally operated.

INDUSTRIAL APPLICABILITY

As is apparent from the above description, a battery cell assembly according to the present invention is configured to have a structure in which an expansion opening part is formed at one surface or opposite surfaces of each of at least two cell housing members and battery cells are stacked such that the at least two expansion opening parts face each other. When repulsive force is applied to the battery cells such that the distance between the cell housing members is increased, therefore, electrical connection between the battery cells in the respective cell housing members is ruptured with the result that the battery cell assembly is cut off, thereby achieving a more rapid cut-off effect than in the conventional battery cell assembly.

In addition, the cut-off effect due to rupture of the electrical connection is achieved by abnormal operation of the battery cells which are laterally stacked as well as abnormal operation of the battery cells mounted in the outermost unit modules, thereby achieving higher safety and operational reliability than in the conventional battery cell assembly.

The invention claimed is:

1. A battery cell assembly comprising:
a plurality of battery cells stacked while being electrically connected to each other;
at least two cell housing members, one or more of the plurality of battery cells being mounted in each of the cell housing members in a state in which opposite sides of the one or more of the battery cells are surrounded by each cell housing member excluding electrode terminals of the battery cells, each cell housing member further having at least one expansion opening part through which a portion of a main body of each of the battery cells is exposed outward when the battery cells expand, the expansion opening parts being formed at one surface or opposite surfaces of each of the at least two cell housing members, and the battery cells are stacked such that the at least two expansion opening parts face each other, and
wherein a pair of expansion opening parts facing each other and another adjacent pair of the expansion opening parts are diagonally arranged,
wherein the two or more battery cells mounted in each cell housing member are connected in parallel to each other,
wherein the battery cells between the respective cell housing members are connected in series to each other via an inter bus bar, the inter bus bar is ruptured when expansion force generated due to swelling of the battery cells is concentrated on the expansion opening parts, and
wherein each of the pairs of expansion opening parts being formed at a side of the cell housing member closer to a first end of the battery cell having the inter bus bar than to a second end of the battery cell that is opposite the first end.

2. The battery cell assembly according to claim 1, wherein each of the expansion opening parts is formed at each cell housing member in the shape of an opening, through which a portion of the main body of a corresponding one of the battery cells is exposed even in a state in which the battery cell does not expand.

3. The battery cell assembly according to claim 1, wherein each of the expansion opening parts is formed at each cell housing member in the shape of a notch configured to be ruptured when a corresponding one of the battery cells expands such that a portion of the main body of the battery cell is exposed.

4. The battery cell assembly according to claim 1, wherein each of the expansion opening parts is formed at a position of each cell housing member adjacent to an electrode terminal connection region between the battery cells such that the electrode terminal connection region is ruptured when the battery cells expand and, therefore, the battery cell assembly is cut off.

5. The battery cell assembly according to claim 4, wherein each of the expansion opening parts is formed at one side part of each cell housing member adjacent to the electrode terminal connection region.

6. The battery cell assembly according to claim 1, wherein each of the expansion opening parts has an area equivalent to 10 to 50% a total area of one surface of each cell housing member at a position of each cell housing member adjacent to an electrode terminal connection region between the battery cells.

7. The battery cell assembly according to claim 1, wherein one of the expansion opening parts is formed at a lower surface of an uppermost one of the cell housing members.

8. The battery cell assembly according to claim 1, wherein one of the expansion opening parts is formed at an upper surface of a lowermost one of the cell housing members.

9. The battery cell assembly according to claim 1, wherein the expansion opening parts are formed at opposite surfaces of the other ones of the cell housing members excluding uppermost and lowermost ones of the cell housing members.

10. The battery cell assembly according to claim 9, wherein the expansion opening parts formed at the opposite surfaces of the cell housing members are diagonally arranged.

11. The battery cell assembly according to claim 9, wherein the expansion opening parts formed at the opposite surfaces of the cell housing members face each other.

12. The battery cell assembly according to claim 1, wherein a pair of the expansion opening parts facing each other and another adjacent pair of the expansion opening parts face each other.

13. The battery cell assembly according to claim 1, wherein each cell housing member comprises a pair of a first housing and a second housing coupled to each other and the first housing of a first one of the battery cells and the second housing of a second one of the battery cells constituting a stacked structure together with the first one of the battery cells are provided at outer surfaces thereof with protrusions to define coolant channels formed at regions of the first housing and the second housing excluding the expansion opening parts.

14. The battery cell assembly according to claim 13, wherein the protrusions are formed at corresponding positions of the first housing and the second housing.

15. The battery cell assembly according to claim 1, wherein each of the battery cells is configured to have a structure in which an electrode assembly is mounted in a battery case formed of a laminate sheet comprising a metal layer and a resin layer and the battery case is thermally bonded along an outer circumference of an electrode assembly receiving unit to form a sealed portion.

16. A battery module comprising a battery cell assembly according to claim 1.

17. A battery pack comprising a battery module according to claim 16.

18. A device using a battery pack according to claim 17 as an electric power source or a power source.

19. A battery cell assembly comprising a plurality of battery cells stacked while being electrically connected to each other, wherein one or more of the battery cells are mounted in each cell housing member in a state in which opposite sides of the battery cells are surrounded by each cell housing member excluding electrode terminals of the battery cells, an expansion opening part, through which a portion of a main body of each of the battery cells is exposed outward when the battery cells expand, is formed at one surface or opposite surfaces of each of the at least two cell housing members, and the battery cells are stacked such that the at least two expansion opening parts face each other, wherein one of the expansion opening parts is formed at a lower surface of an uppermost one of the cell housing members, wherein one of the expansion opening parts is formed at an upper surface of a lowermost one of the cell housing members, and wherein the expansion opening parts are formed at opposite surfaces of the other ones of the cell housing members excluding uppermost and lowermost ones of the cell housing members, and wherein a pair of expansion opening parts facing each other and another adjacent pair of the expansion opening parts are diagonally arranged, wherein the two or more battery cells mounted in each cell housing member are connected in parallel to each other, wherein the battery cells between the respective cell housing members are connected in series to each other via an inter bus bar, the inter bus bar is ruptured when expansion force generated due to swelling of the battery cells is concentrated on the expansion opening parts, and wherein each of the pairs of expansion opening parts being formed at a side of the cell housing member closer to a first end of the battery cell having the inter bus bar than to a second end of the battery cell that is opposite the first end.

* * * * *